United States Patent Office  3,395,174
Patented July 30, 1968

3,395,174
1,1-DIHYDROPERFLUOROALKYL α-TRIFLUORO-METHACRYLATES
Martin Knell, Ossining, and Martin Dexter, Briarcliff Manor, N.Y., assignors to Geigy Chemical Corporation, Greenburgh, N.Y., a corporation of Delaware
No Drawing. Filed Aug. 13, 1965, Ser. No. 479,659
2 Claims. (Cl. 260—486)

ABSTRACT OF THE DISCLOSURE

Copolymers of 1,1-dihydroperfluoroalkyl α-trifluoromethacrylates are useful in providing oil and water repellent finishes for textiles, paper, leather and the like. A particularly preferred monomer, because of the properties of copolymers made from this monomer, is 1,1-dihydroperfluorooctyl α-trifluoromethacrylate. The polymers obtained from 1,1-dihydroperfluoroalkyl α-trifluoromethacrylates are characterized by enhanced resistance to hydrolysis.

---

This invention relates to fluorine-containing monomers and to polymers with useful soil repellent properties obtained therefrom. More particularly it relates to 1,1-dihydroperfluoroalkyl α-trifluoromethacrylates and to copolymers thereof. The new monomers provide polymers with oil- and water-repellent finishes useful for materials such as textiles, paper, leather, painted wooden and metallic surfaces, and the like.

The perfluorinated compounds contemplated by the instant invention are those of the formula:

$$C_nF_{2n+1}CH_2-O-\overset{O}{\underset{}{\overset{\|}{C}}}-\underset{CF_3}{\overset{}{C}}=CH_2$$

wherein $n$ is a whole number of from 3 to 17. The $C_nF_{2n+1}$ radical may be straight or branched chain.

Especially useful as an embodiment of this invention is the compound 1,1-dihydroperfluorooctyl α-trifluoromethacrylate, a compound of the above formula in which the straight chain $C_nF_{2n+1}$ radical has a value for $n$ of 7.

The new monomers and polymers obtained therefrom are characterized by enhanced resistance to hydrolysis. This provides substantial advantage in their use as fabric finishes, when compared to finishes previously used for the purpose of soil repellency. Fabrics finished with polymers made from the instant monomer retain their soil-repellent properties after repeated washings.

The 1,1-dihydroperfluoroalkyl α-trifluoromethacrylates of this invention form copolymers with many monomers containing an ethylenic linkage. Illustrative of such comonomers are butadiene, chloroprene, 1,1,2-trifluoro-1,3-butadiene, octyl acrylate, dodecyl methacrylate, vinyl chloride, and the like. Especially useful to form soil-repellent finishes are copolymers of 1,1-dihydroperfluorooctyl α-trifluoromethacrylate with octyl methacrylate.

The new perfluorinated compounds can be prepared from readily available materials according to the reaction outlined in the following sequence:

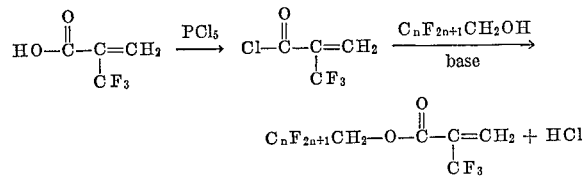

wherein $n$ is as above defined. The term "base" contemplates a reagent which promotes condensation by binding the elements of hydrogen chloride eliminated as a byproduct. Quinoline is an especially useful base. The starting materials are readily available or can be prepared by techniques readily within the capabilities of those skilled in the art. α-Trifluoromethacrylic acid, for example, can be prepared by the procedure of Buxton, Stacey and Tatlow, J. Chem. Soc., 1954, 366. 1,1-dihydroperfluoroalcohols of the formula $$C_nF_{2n+1}CH_2OH$$

can be obtained, for example, by the procedures described in Husted et al., U.S. 2,666,797. As will be more fully exemplified hereinafter, the new 1,1-dihydroperfluoroalkyl α-trifluoromethacrylates are conveniently prepared by treating α-trifluoromethacrylic acid with a slight molar excess of phosphorus pentachloride. The reaction mixture, after a slight temperature increase subsides, is allowed to stand for about 16 hours. The residue is purified by distillation to afford α-trifluoromethacrylyl chloride. This is converted to the instant esterified monomers by adding it to a stirred mixture of an equimolar amounts of the appropriate 1,1-dihydroperfluoroalkanol and quinoline in about one-fourth volume of acetonitrile, based on the reaction volume. The reaction temperature preferably is maintained below about 60° and the quinoline hydrochloride usually precipitates. The product can be recovered, for example, by adding several volumes of water and then extracting it into ether, and separating the ether, the product remaining as a residue after evaporation of the ether. The product can be purified, for example, by distillation, preferably in a vacuum. Polymerization during distillation can be inhibited by adding a small amount of hydroquinone.

Copolymers of the instant monomers are formed by standard procedures well known to those skilled in the art. Copolymerization occurs readily by bulk, solution or emulsion techniques, employing free radical-forming catalysts. The ratios of percentages by weight of the respective monomers used is not particularly critical in the formation of useful copolymers. For example, charge ratios of the instant 1,1-dihydroperfluoroalkyl α-trifluoromethacrylate monomers may vary from 1 to 99% by weight of the total monomer mixture. It is preferred however, for the best balance of economy and ultimate properties, to use somewhat less than 50% by weight of the instant monomers based on the total monomer mixture. Suitable techniques for preparing copolymers from the instant monomers are exemplified hereinafter.

Films of the copolymers can be prepared by casting from solvent solutions. Especially useful as solvents are fluorinated liquids, and special mention is made of α,α,α-trifluorotoluene, also known as benzotrifluoride.

As a demonstration of the substantial hydrophobic and oleophobic properties of the new copolymers, mention is made of the finding that a smooth film of the bulk copolymer of a mixture of 36.5% by weight of 1,1-dihydroperfluorooctyl α-trifluoromethacrylate and 63.5% by weight of octyl methacrylate had a surface energy of 15 dynes/cm.

Similarly other copolymers containing the monomers within the scope of this invention also provide films with strongly hydrophobic and oleophobic properties.

The following examples are illustrative of the compounds of the instant invention. They are provided for purposes of exemplification and are not to be construed to limit the scope of the claims in any manner.

Example I.—1,1-dihydroperfluorooctyl α-trifluoromethacrylate

To a 500 ml. 3-necked flask containing 98.1 parts (0.70 mole) of α-trifluoromethacrylic acid (Buxton, Stacey and Tatlow, J. Chem. Soc., 1954, 366) is added in small increments with stirring 156 parts (0.75 mole) of phosphorus pentachloride. The reaction is exothermic to 45° C. After being allowed to stand overnight under a slow stream of nitrogen, the reaction mixture is filtered, then distilled at atmospheric pressure. The fraction boiling at 90–103° C. is redistilled through a spinning band column affording 53.5 parts of α-trifluoromethacrylyl chloride, B.P. 91° C.

To a stirred solution of 126.2 parts (0.315 mole) of 1,1-dihydroperfluorooctanol and 40.7 parts (0.315 mole) of quinoline in 50 parts by volume of acetonitrile is added dropwise in about 5 minutes 50.0 parts of α-trifluoromethacrylyl chloride. The temperature is not allowed to exceed 60° C. Stirring is continued without cooling until precipitation occurs after which the reaction mixture is allowed to stand overnight. The mixture then is poured into water, the product is extracted into ether, the ether is dried and then evaporated. The residue is inhibited with a small amount of hydroquinone and distilled at 20 microns pressure and 55–7° C. The yield is 81.2 parts.

Example II

By the procedure of Example I substituting stoichiometrically equivalent amounts of appropriate 1,1-dihydroperfluoroalkanols for 1,1-dihydroperfluorooctanol, there are obtained the following new 1,1-dihydroperfluoroalkyl α-trifluoromethacrylates:

$$C_nF_{2n+1}CH_2-O-\overset{O}{\underset{}{C}}-\underset{CF_3}{\overset{}{C}}=CH_2$$

| $C_nF_{2n+1}CH_2$: | $n$ |
|---|---|
| $CF_3CF_2CF_2CH_2$ | 3 |
| $(CF_3)_2CF.CH_2$ | 3 |
| $CF_3(CF_2)_{16}CH_2$ | 17 |
| $CF_3(CF_2)_{10}CH_2$ | 11 |
| $CF_3(CF_2)_4CH_2$ | 5 |

Example III

A bulk copolymer of 1,1-dihydroperfluorooctyl α-trifluoromethacrylate is prepared by heating 36.5 parts by weight of the monomer of Example I and 63.5 parts by weight of n-octyl methacrylate with 0.5% by weight of azodiisobutyrodinitrile in an evacuated, sealed ampule for 20 hours at 80° C. Films of this copolymer have strongly hydrophobic and oleophobic properties.

Example IV

Copolymers with soil repellent properties are obtained by heating stoichiometrically equivalent amounts of the new monomers of Example II with stoichiometrically equivalent amounts of n-octyl methacrylate under the conditions of Example III.

What is claimed is:
1. A compound of the formula:

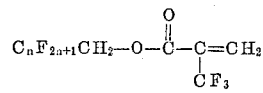

wherein $n$ is a whole number of from 3 to 17.

2. 1,1-dihydroperfluorooctyl α-trifluoromethacrylate.

References Cited
UNITED STATES PATENTS

| | | | |
|---|---|---|---|
| 2,472,811 | 6/1949 | Dickey | 260—89.5 |
| 2,628,958 | 2/1953 | Bittles | 260—486 XR |
| 2,642,416 | 6/1953 | Ahlbrecht et al. | 260—486 XR |
| 3,102,103 | 8/1963 | Ahlbrecht et al. | 260—486 XR |
| 3,171,861 | 3/1965 | Ahlbrecht | 260—486 XR |

LORRAINE A. WEINBERGER, *Primary Examiner.*

A. P. HALLUIN, *Assistant Examiner.*